United States Patent Office 3,319,298
Patented May 16, 1967

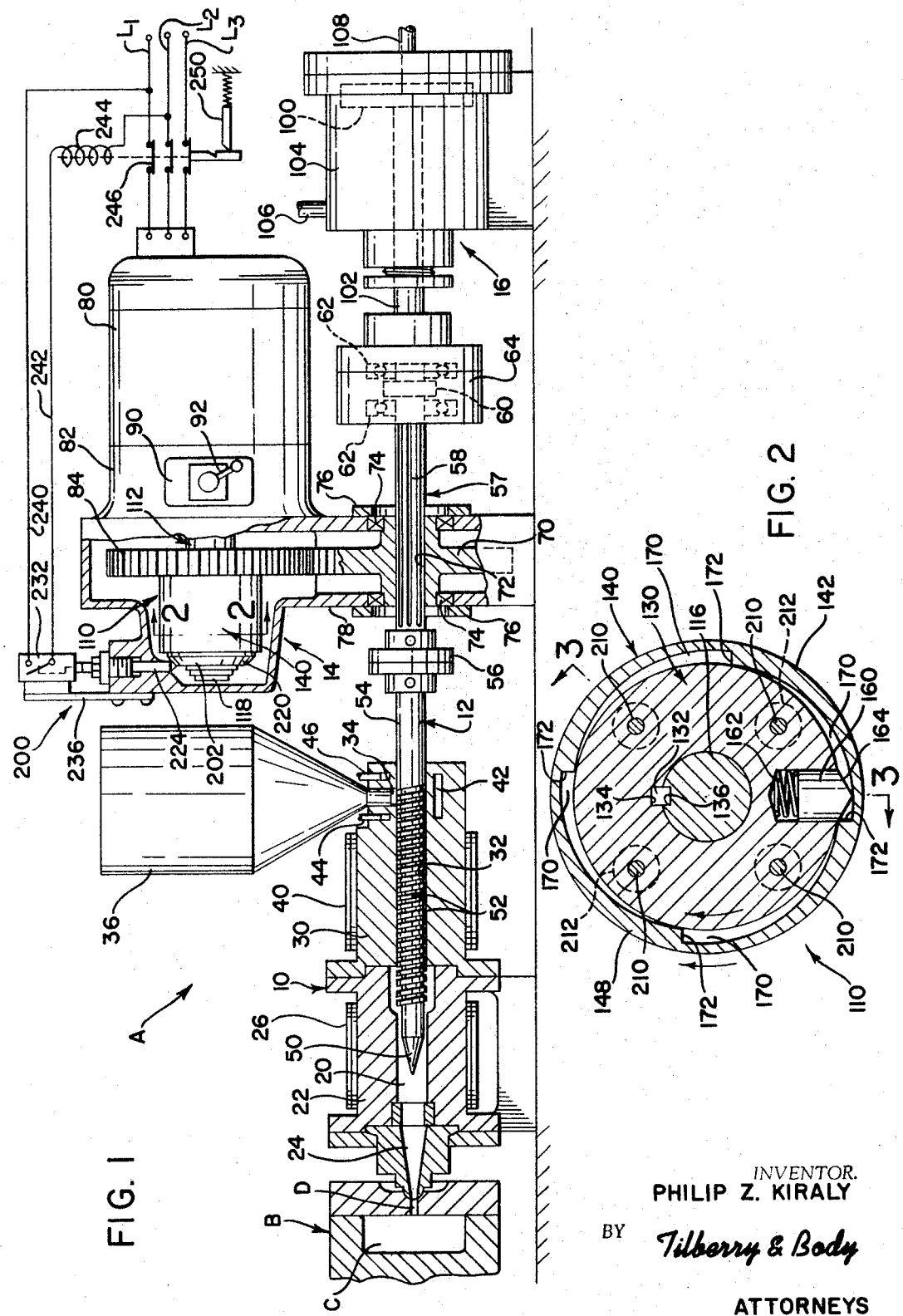

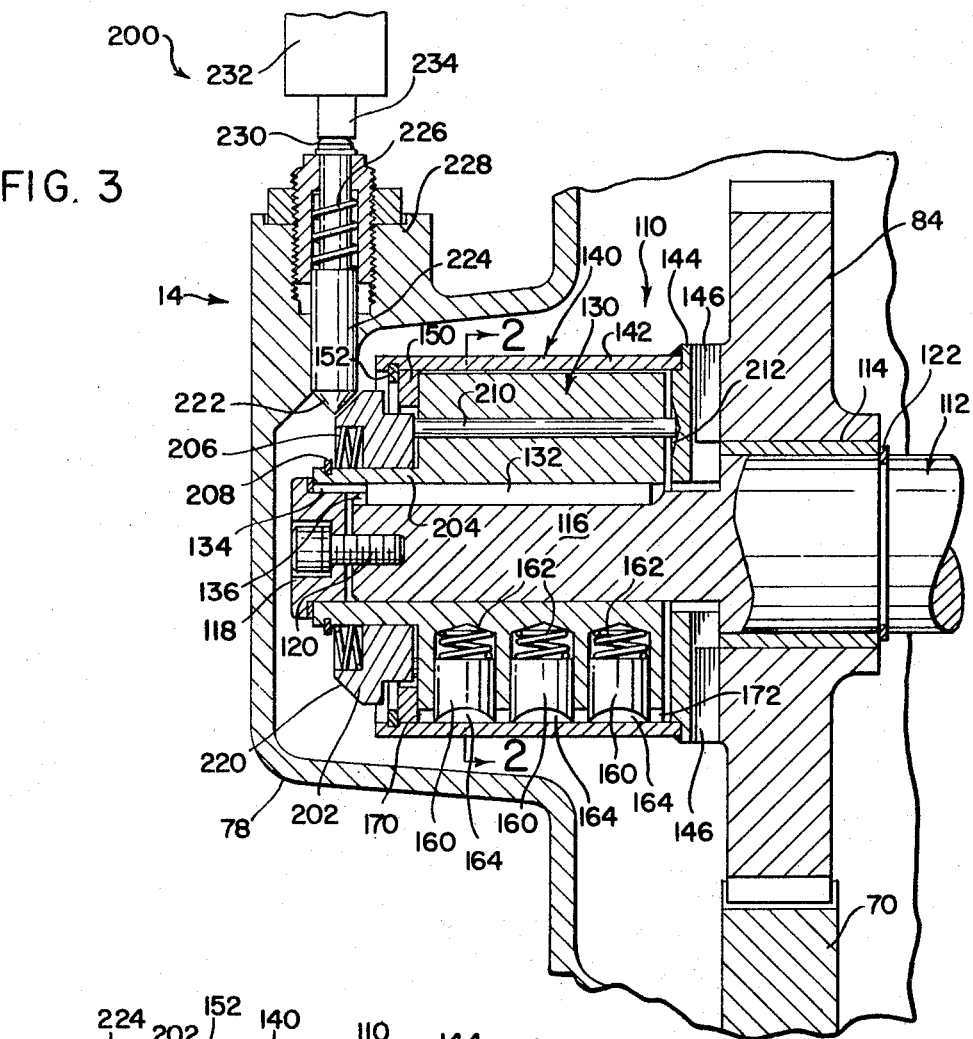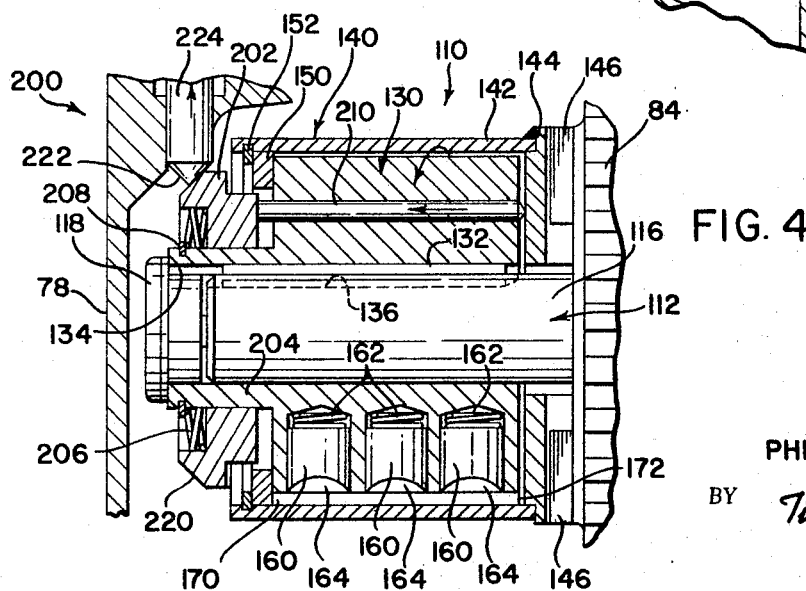

3,319,298
INJECTION MOLDING APPARATUS FOR
PLASTIC MATERIALS
Philip Z. Kiraly, Cleveland, Ohio, assignor to Van Dorn
Company, Cleveland, Ohio, a corporation of Ohio
Filed Apr. 1, 1965, Ser. No. 444,584
12 Claims. (Cl. 18—30)

The present invention pertains to the art of injection molding and more particularly to an apparatus for injection molding plastic materials.

This invention is particularly applicable to an injection molding apparatus of the general type having a feed screw which is rotated for loading the apparatus with an injectable plastic material and reciprocated for injecting this material into a mold and it will be described with particular reference thereto; however, it is appreciated that the invention has much broader applications and can be used in other similar injection molding apparatus, having intermittently rotated feed screws.

In molding thermoplastic materials, such as cellulose acetate, ethyl cellulose, polyvinyl chloride and polystyrene, it has become somewhat common practice to use an injection molding apparatus including a feed screw which is first rotated to fill the apparatus with a charge of the thermoplastic material and, then, reciprocated to inject the material from an orifice into an adjacently positioned mold. In such an apparatus, the feed screw is successively rotated and reciprocated for each injection of material into the mold; therefore, the feed screw is subjected to intermittent torsional stressing which has heretofore caused frequent fracture of the feed screw. The present invention is directed toward an apparatus which overcomes this particular problem.

In an apparatus of the type defined above, the thermoplastic material is forced into an injection chamber of the apparatus by rotation of the feed screw within a bore leading to the chamber. The chamber and screw bore are heated by external means so that the thermoplastic material is plasticized within the chamber and as it moves along the feed screw. If the material hardens within the chamber or around the feed screw, the torque necessary for rotating the screw may exceed the maximum torque which can be imposed upon the feed screw. When this happens, the feed screw, which is generally driven by an electric motor, is often fractured. In addition, if insufficient time is provided between subsequent injections of the plastic material from the injection chamber, the material does not adequately plasticize during rotation of the feed screw. This also has been a source of feed screw fracturing.

The problem of fracturing the feed screw in an injection molding apparatus can be somewhat overcome by accurate and precise operation of the apparatus; however, such operation requires a considerable amount of attention and knowledge by the operator. Since it is difficult to assure that the operator will accurately control the machine at all times, it has been found that the feed screw of such an injection molding apparatus is often fractured during general use of the apparatus.

These and other difficulties found in the prior injection molding apparatus have been completely overcome by the present invention which is directed toward an injection molding apparatus wherein the feed screw cannot be fractured during rotation thereof.

In accordance with the present invention there is provided in an apparatus of the type described a clutch within the drive train from the motor to the screw, the clutch including means responsive to a preset torque applied by the drive train on the screw for releasing the screw from positive driving relationship with the motor when the torque exceeds such preset value.

The primary object of the present invention is the provision of an injection molding apparatus of the type having an intermittently rotated feed screw for filling the apparatus with a charge of thermoplastic material which apparatus is durable in operation and can be easily incorporated within existing apparatus.

Another object of the present invention is the provision of an injection molding apparatus of the type having an intermittently rotated feed screw for filling the apparatus with a charge of thermoplastic material which apparatus is so constructed to substantially prevent torsional failure of the feed screw during the filling operation.

Still another object of the present invention is the provision of a molding apparatus of the type having an intermittently rotated feed screw for filling the apparatus with a charge of thermoplastic material which apparatus includes a torque responsive clutch in the drive train for rotating the feed screw to prevent excessive torque from being imposed on the feed screw.

Another object of the present invention is the provision of an injection molding apparatus of the type having an intermittently rotated feed screw for filling the apparatus with a charge of thermoplastic material which apparatus includes a torque responsive clutch in the drive train for rotating the feed screw to prevent excessive torques being imposed on the feed screw, with the clutch having a rapid torque response.

Yet another object of the present invention is the provision of an injection molding apparatus of the type having an intermittently rotated feed screw for filling the apparatus with a charge of thermoplastic material which apparatus includes a torque responsive clutch in the drive train for rotating the feed screw to prevent excessive torque from being imposed on the feed screw and a means for de-energizing the motor used in driving the feed screw upon release of the clutch.

These and other objects and advantages will become apparent from the following description used to illustrate the preferred embodiment of the invention as read in connection with the accompanying drawings in which:

FIGURE 1 is a side, elevational view showing, somewhat schematically, the preferred embodiment of the present invention;

FIGURE 2 is an enlarged, cross-sectional view taken generally along line 2—2 of FIGURE 1 and along line 2—2 of FIGURE 3;

FIGURE 3 is a cross-sectional view taken generally along line 3—3 of FIGURE 2 with the addition of other structural features; and, FIGURE 4 is a cross-sectional view similar to FIGURE 3 with the preferred embodiment in a different operating condition.

Referring now to the drawings wherein the showings are for the purpose of illustrating a preferred embodiment of the invention only and not for the purpose of limiting same, FIGURE 1 shows an apparatus A for injecting thermoplastic material into a mold B, which mold has an appropriately shaped cavity C and an inlet D. Basically, the apparatus A includes an injection head 10, a feed screw 12, a mechanism 14 for rotating the feed screw to fill the injection head with a charge of thermoplastic material and a mechanism 16 for reciprocating the feed screw to force the thermoplastic material through inlet D into the mold cavity C.

Referring now in more detail to the injection head 10, the head includes an injection chamber 20 defined by a sleeve 22 and terminating in a nozzle 24 immediately opposite the mold inlet D. In order to plasticize thermoplastic material within the chamber 20 there is provided an appropriate heating arrangement around sleeve 22 which arrangement takes the form of an electrical heater 26. Mounted in tandem with sleeve 22 is another sleeve 30 which defines a screw bore 32 for rotatably and reciprocally mounting the feed screw 12 with respect to the injection head 10. To supply thermoplastic material into the bore 32, there is provided a passageway 34 communicated with a hopper 36 filled with an appropriate thermoplastic material. As the material moves into the bore 32, a heater 40, similar to heater 26, raises the temperature of the material and commences the plasticizing of the material before it enters the injection chamber 20. In order to prevent overheating of the material adjacent the rearwardmost portion of bore 32 there is provided a cooling passage 42 in sleeve 30 which coolant passage is supplied with an appropriate coolant, such as water, through lines 44, 46.

The feed screw 12 includes a forwardmost tip 50 positioned within the injection chamber 20, a thread 52 on the portion of the screw extending between passageway 34 and chamber 20, a neck 54 extending out from the sleeve 30 and a coupling 56. The coupling 56 joins the feed screw 12 with a feed screw drive shaft 57 having an outer spline 58 and a terminal collar 60. The collar 60 is rotatably mounted within bearings 62 which are, in turn, supported by the bearing housing 64. As so far described, the feed screw is mounted for rotation within bore 32 by mechanism 14 and for reciprocation within this bore by mechanism 16.

Referring now more particularly to the details of the feed screw rotating mechanism 14, this mechanism includes a spur gear 70 having a splined bore 72 adapted to slidably receive the spline 58 of drive shaft 57. The gear 70 is journaled within spaced bearings 74 which are held by bearing retainers 76 within a housing 78. As illustrated, spur gear 70 is rotated by electric motor 80 adapted to be connected onto a three phase power system including lines $L_1$, $L_2$ and $L_3$. Since the electric motor rotates at a speed substantially greater than the speed required to rotate the feed screw 12, there is provided a drive train between the motor and the gear 70. This drive train can take any of a variety of forms and, for the purpose of simplicity, the drive train is not shown in detail, although it is mounted within housing 82 and includes an input coupled to the motor 80 and an output, in the form of a spur gear 84, coupled onto the feed screw 12 through spur gear 70.

In order to adjust the rotational speed of the feed screw, there is provided a transmission 90 within housing 82 which transmission has a shift handle 92 for changing the gear ratio of the drive train within the housing 82. The details of the transmission 90 are not a part of the present invention; therefore, for the purpose of simplicity, they are not illustrated herein.

In operation of the apparatus A, as so far described, before each injection of plastic material into mold cavity C, the feed screw 12 is rotated by motor 80 through spur gear 70. Rotation of the feed screw forces plastic material from hopper 36 axially through bore 32 toward the injection chamber 20. Heater 40 heats the plastic material within bore 32. If the material is not completely plasticized when it reaches chamber 20, the heater 26 finalizes the plasticizing of the material so that it is ready for injection into cavity C. As chamber 20 is being filled by rotation of the feed screw 12, the feed screw is forced backwardly by the material occupying the chamber 20. This backward movement of the feed screw is allowed by the spline 58 and the splined bore 72 of gear 70.

The screw reciprocating mechanism, in accordance with the illustrated embodiment of the invention, includes a piston 100 connected onto bearing housing 64 by a rod 102. The piston is reciprocally moved within a cylinder 104 by the proper introduction of fluid into the cylinder 104 through lines 106, 108. The feed screw 12 is moved backwardly from chamber 20 as the chamber is filled. After the chamber 20 is filled with a predetermined amount of plasticized material, the rotation of the feed screw is stopped and the piston 100 forces the feed screw forward. This injects the plasticized material through nozzle 24 into cavity C.

A tremendous torque is exerted by motor 80 on the drive shaft 57 during this filling operation. It has been found that if the material within bore 32 or within the chamber 20 solidifies, this torque on feed screw 12 can cause torsional fracture of the feed screw. Torsional fracture of the feed screw can be caused by other occurrences within the injection head 10, such as improper plasticization of the material being forced into the injection chamber 20.

As so far described, the apparatus A does not differ from the known injection molding apparatus which exhibited the problems herein above outlined. The present invention is directed toward an arrangement for overcoming these difficulties so that the feed screw will not be torsionally fractured during repeated cycling of apparatus A.

In accordance with the present invention, the apparatus A is provided with an arrangement for preventing torsional fracture of feed screw 12. This arrangement includes a torque responsive clutch 110 positioned within the gear train between the motor 80 and the output gear 84. In accordance with the preferred embodiment of the invention, the clutch 110 is positioned between the transmission 90 and the output gear 84 so that changes in the transmission ratio of the gear train do not affect the overall operation of the clutch and the clutch will function in accordance with the actual torque being applied onto the feed screw 12 by the spur gear 70.

Referring now more particularly to the details of clutch 110, as best shown in FIGURES 2-4, the clutch includes an input shaft 112 extending from the transmission 90 and journaled within gear 84 by an appropriate plane bearing 114. The shaft 112 has an extension 116 adapted to receive a cap 118 which is held in place by a bolt 120. The cap 118 cooperates with a snap ring 122 to hold the clutch 110 in a proper relationship with respect to the shaft 112 so that the output gear 84 remains directly above the spur gear 70.

Within the clutch 110 there is provided an internal clutch element 130 secured in a non-rotational manner onto extension 116 by a key 132 adapted to be received within a keyway 134 on the element 130 and a keyway 136 on extension 116. By this construction, the internal clutch element 130 is positively rotated at all times by the output shaft 112.

Surrounding the internal clutch element 130 there is provided an outer clutch element 140 which includes a sleeve 142 welded, or otherwise attached, onto boss 144 connected to output gear 84 by keys 146. In order to provide appropriate lubrication for the clutch, the boss 144 includes a plurality of radially extending lubricant ports adjacent keys 146. The internal clutch element 130 is axially positioned within the outer clutch element 140 by a retaining ring 150 that is held in place by a snap ring 152. Consequently, the internal and outer clutch elements do not move appreciably in an axial direction with respect to each other.

The internal and outer clutch elements, 130, 140, are coupled with respect to each other by force transmitting elements or detents 160. These elements, during normal operation of apparatus A, positively transmits force from the internal element 130 to the outer element 140. It is appreciated that a variety of detents 160 could be used in clutch 110; however, in accordance with the illustrated embodiment of the present invention, three of these detents are shown. To maintain the detents 160 in a position to transmit force between the internal and outer clutch elements, there are provided springs 162 behind the detents. The springs are provided with a preselected spring constant so that a known force will urge the detents 160 radially outward from the internal clutch element 130.

The detents have pointed tips 164 that are received within detent camming slots 170 provided within the sleeve 142 of clutch element 140 (see FIGURE 2). The camming slots define circumferentially spaced shoulders 172 which are adapted to abut the tips 164 of detents 160 so that the outer elements 140 can be rotated in the same direction as the inner elements, which direction is shown by the arrows in FIGURE 2.

In operation of the clutch 110, the detents remain against one of the shoulders 172 during normal operation of apparatus A. This provides a positive driving connection between motor 80 and gear 70 which is directly connected onto the feed screw 12. When the torque being exerted by the motor 80 on the feed screw 12 exceeds a predetermined maximum, which is determined by the spring constant of spring 162, the pointed tips 164 of detents 160 ride over the shoulder 172. This disconnects the motor 80 from gear 84 and prevents further torque from being exerted on screw 12. The camming of the detents 160 over the shoulder 172 is illustrated in FIGURE 4. This permits and causes relative movement between the internal clutch element 130 and the outer clutch element 140.

As the detents ride along the cam slots 170 they contact another of the shoulders 172. If the torque being exerted still exceeds the torque necessary for compressing the springs 162, the springs are again compressed and the detents move over this next shoulder. This overriding of the shoulders continues so that a predetermined maximum torque is exerted on the feed screw 12. This clutch action prevents torsional fracture of the feed screw and substantially decreases maintenance costs during operation of apparatus A. This is a substantial advance in the art of injection molding.

If the torque remains above the preset maximum, the detents will be rapidly moved back and forth by the shoulders 172. This repeated movement is quite rapid and causes a pounding of the detent tips 164 which could damage the tips if it continued. To overcome this difficulty, in accordance with the present invention, there is provided a mechanism 200 for disconnecting the motor when the clutch is released in accordance with an excessive torque being exerted on the screw 12. In accordance with this aspect of the present invention, the mechanism 200 includes a ring 202, see FIGURES 3 and 4, which ring is slidably received on an extension 204 of the internal clutch elements 130. The ring 202 is forced axially toward the gear 84 by a plurality of biasing springs 206 that abut a spring retainer 208. A number of push rods 210, four of which are used in the preferred embodiment of the invention, are slidably received within the internal clutch element 130. The forward ends of the push rods bear against the ring 202 and the rearward ends of the push rods are received within cam recesses 212 on boss 144. The recesses 212 are located within the boss 144 so that the rods 210 will fit into the recesses when the detents 160 are against a shoulder 172.

The forwardmost end of ring 202 is provided with a chamfered shoulder 220 which is adapted to abut a conical tip 222 of a plunger 224 movable on an axis substantially perpendicular to the rotational axis of shaft 112. The plunger 224 is biased downwardly by a spring 226 housed within boss 228 of housing 78. Consequently, during normal operation of the apparatus A, the plunger 224 is held in the downwardmost position by spring 226. The upper end of the plunger is provided with a tip 230 adapted to actuate micro-switch 232 through an operating plunger 234. Micro-switch 232 is supported on housing 78 by an appropriate means, such as bracket 236, shown in FIGURE 1. Output leads 240, 242 of micro-switch 232 are connected across lines $L_1$, $L_2$ and include a solenoid 244 for actuating circuit breakers 246. When the circuit breakers 246 are opened by solenoid 244, a latch 250 holds the circuit breakers open until manually released.

In operation of the mechanism 200, when the maximum torque to be exerted on screw 12 is exceeded, the internal clutch element 130 rotates with respect to the outer clutch element 140, as shown in FIGURE 4. This causes the push rods 210 to move away from gear 84 by the camming action of recesses 212. The push rods force ring 202, against spring 206, toward the plunger 224. The shoulder 220 contacts conical tip 222 and forces the plunger 224 in an upward direction. This closes the contact within micro-switch 232, energizes solenoid 244 and opens the circuit breakers 246. In this manner, the motor 80 is de-energized as soon as the clutch is released by an excessive torque being exerted on the feed screw so that the detents 160 are not damaged by rapid and repeated pounding against circumferentially spaced shoulders 172.

After the cause of the excessive torque on the feed screw has been corrected, the motor 80 can again be energized for operation of the apparatus A by manually releasing latch 250.

The present invention has been described in connnection with a single structural embodiment; however, it is to be appreciated that various changes may be made within this embodiment without departing from the intended spirit and scope of the present invention as defined by the appended claims.

Having thus described my invention, I claim:

1. In an injection molding apparatus including an injection chamber, an injection screw, means for rotating said screw to fill said chamber with a plastic, injectable material, and means for forcing said screw axially after said chamber is filled to inject said material into a mold adjacent said chamber, said screw rotating means including a motor and a drive train driven by said motor for rotating said screw, the improvement comprising: a clutch within said drive train, said clutch including means responsive to the torque applied by said drive train on said screw for releasing said screw from positive driving relationship with said motor when said torque exceeds a preset maximum.

2. The improvement as defined in claim 1 wherein said clutch includes a first element drivingly coupled with said screw, a second element drivingly coupled with said motor and said torque responsive means includes a force transmitting element releasably coupling said first and second elements and means for releasing said force transmitting element from driving engagement with one of said first and second elements when said torque exceeds said preset maximum.

3. The improvement as defined in claim 2 wherein said force transmitting element comprises a detent latch mounted on one of said first and second elements and a detent recess in the other of said first and second elements and a spring for forcing said detent latch into said recess, said spring having a preset spring constant to allow said detent to move from said recess when said torque exceeds said preset maximum.

4. The improvement as defined in claim 1 wherein said drive train includes an input drivingly coupled with said motor, an output drivingly coupled with said screw and a speed ratio changing means between said input and output, said clutch being positioned in said gear train between said speed ratio changing means and said screw.

5. The improvement as defined in claim 1 wherein said motor is an electrically operated motor and said apparatus includes a switch for energizing said electric motor, and means for opening said switch, said switch opening means being responsive to release of said screw from positive driving relationship with said motor.

6. The improvement as defined in claim 1 wherein said clutch includes a first element drivingly coupled with said screw, a second element drivingly coupled with said motor and said torque responsive means includes a force transmitting element releasably coupling said first and second elements and means for releasing said force transmitting element from driving engagement with one of said first and second elements when said torque exceeds said preset maximum, said motor being an electrically operated motor, a switch for energizing said electric motor, and means for opening said switch, said switch opening means being responsive to release of said force transmitting element from one of said first and second elements.

7. The improvement as defined in claim 6 wherein first and second elements rotate with respect to each other when said force transmitting element is released, and said switch opening means including a member movable upon relative rotation of said first and second elements and means responsive to movement of said member for opening said switch.

8. The improvement as defined in claim 7 wherein said member is a ring rotatable with one of said elements, an operating rod reciprocally mounted within said one of said elements, said rod connected onto said member to move said member upon reciprocation of said rod, a camming slot in the other of said elements with a cam surface axial of said rod, said rod extending into said camming slot whereby relative rotation of said elements reciprocates said rod and, thus, said member to open said switch.

9. In an injection molding apparatus including an injection chamber, an injection screw, means for rotating said screw to fill said chamber with a plastic, injectable material, and means for forcing said screw axially after said chamber is filled to inject said material into a mold adjacent said chamber, said screw rotating means including an electric motor and a drive train driven by said motor for rotating said screw, the improvement comprising: a clutch in said drive train, said clutch including an input driven by said motor, an output drivingly coupled with said screw and means for releasing said output from said input when the torque applied by said output on said screw exceeds a predetermined maximum.

10. An injection molding apparatus comprising an injection chamber having an orifice communicated with a mold, an injection screw within a bore, said bore terminating in said injection chamber, a supply of thermoplastic material communicated with said bore at a position remote from said injection chamber, means for heating said bore to plasticize material therein, said screw being reciprocally mounted within said bore, means for rotating said screw to force heated thermoplastic material from said material supply, through said bore and into said chamber, means for simultaneously moving said screw in said bore and away from said chamber as said chamber is being filled, a fluid operated piston means for forcing said screw toward said chamber after said chamber is filled with said material whereby said heated material is injected through said nozzle into said mold, said means for rotating said screw including an electric motor, a drive train having an input driven by said motor and an output driving coupled with said screw and means for releasing said output from said input when the torque applied by said output on said screw exceeds a predetermined maximum.

11. An injection molding apparatus as defined in claim 10 including a switch for energizing said electric motor, and means for opening said switch, said switch opening means being operated in response to release of said input from said output of said clutch.

12. In an extruding apparatus comprising a chamber having an orifice, a bore terminating adjacent said orifice, a feed screw rotatably mounted in said bore, a supply of thermoplastic material communicated with said bore at a position remote from said orifice, means for heating said bore to plasticize material therein, and means for rotating said feed screw to force heated thermoplastic material from said material supply, through said bore, toward said orifice, the improvement comprising: said feed screw rotating means including an electric motor, a drive train having an input driven by said motor and an output driving coupled with said feed screw and means for releasing said output from said input when torque applied by said output on said feed screw exceeds a predetermined maximum.

References Cited by the Examiner

UNITED STATES PATENTS

| 2,764,272 | 9/1956 | Reynolds | 192—150 |
|---|---|---|---|
| 2,930,212 | 3/1960 | Muller et al. | 64—29 |

FOREIGN PATENTS

| 967,564 | 8/1964 | Great Britain. |
|---|---|---|

J. SPENCER OVERHOLSER, *Primary Examiner.*

W. L. McBAY, *Assistant Examiner.*